(No Model.)

F. J. LAMPTON.
Rotary Harrow.

No. 232,355. Patented Sept. 21, 1880.

Witnesses:
W. W. Mortimer,
C. H. Isham

Inventor:
F. J. Lampton,
per
F. A. Lehmann,
Atty.

UNITED STATES PATENT OFFICE.

FLAVIUS J. LAMPTON, OF HAMMONVILLE, KENTUCKY.

ROTARY HARROW.

SPECIFICATION forming part of Letters Patent No. 232,355, dated September 21, 1880.

Application filed May 22, 1880. (No model.)

*To all whom it may concern:*

Be it known that I, FLAVIUS J. LAMPTON, of Hammonville, in the county of Hart and State of Kentucky, have invented certain new and useful Improvements in Rotary Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in wheeled rotary harrows; and it consists in placing upon the angular portion of the pivot upon which the harrow turns a beam or keeper, which projects over the top of the harrow and catches under its two opposite edges, for the purpose of holding the harrow in position in such a manner that it cannot wabble and twist upon its pivot so as to break or injure it.

It further consists in the arrangement and combination of parts, which will be more fully described hereinafter, whereby a simple, cheap, and effective wheeled rotary harrow is produced.

Figure 1:
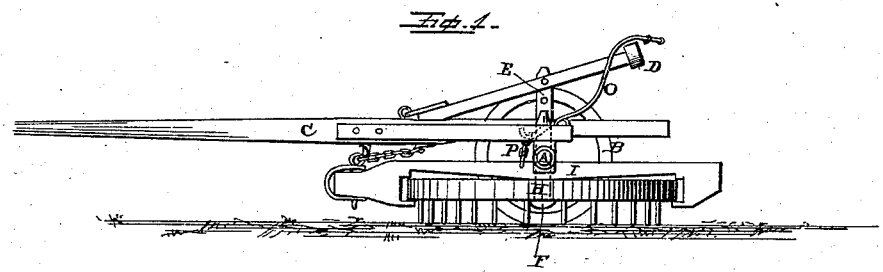
Figure 2:
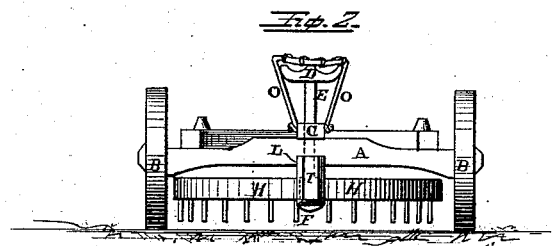
Figure 3:
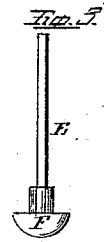

Figure 1 represents a side elevation of my invention with one of the wheels removed. Fig. 2 is a rear view of the same. Fig. 3 is a detached view of the rod on which the harrow turns.

A represents the axle, and B the two driving-wheels. Upon the top of this axle is secured a tongue, C, in the usual manner, and pivoted upon the top of the tongue is the seat D, upon which the driver sits. This seat is supported in an elevated position by the vertically-adjustable and perforated angular bar or rod E. This bar or rod has a large head, F, made upon its lower end, and just above this head the bar or rod is made round, so as to form a pivot upon which the harrow H revolves. This rod, as will be seen, extends up through the harrow, through the keeper I, on top of the harrow, through the beam A, the tongue C, and the seat, and is provided with a number of perforations, so that a pin can be inserted at any suitable point, and thus hold the harrow at any desired position above the ground. In the under side of the beam is cut a recess or notch, L, up into which the keeper or guard I passes when the harrow is raised upward above the ground. This keeper or guard consists of a beam having a recess cut in its under side, so as to catch over the harrow at its two opposite edges, as shown, and bears upon the center of the harrow, so as to hold the harrow steady at all times, and prevent it from twisting and wabbling in such a manner as to break or bend the pivotal rod upon which it turns. In order to hold this keeper against the top of the harrow, and thus secure them together, a pin is passed through the vertically-adjustable rod just above the top of the keeper, so that it cannot rise upward. In this manner the keeper and the harrow are connected together, and the keeper holds the harrow steady and braces it from opposite sides, so that the harrow will not tilt, turn up on edge, or become twisted or bent, as it otherwise would. To the front end of this keeper is secured a clevis, to which the draft-animals can be attached, and thus apply the draft directly to the harrow, and not upon the pivotal rod E, which would have a constant tendency to be broken or bent. Attached to the front end of the upper part of this keeper is a chain, N, by means of which the draft is also brought to bear upon the harrow-frame itself.

Pivoted upon the sides of the tongue, above the axle, is the bent lever O, which is connected at its lower front ends by the chains P with the keeper, by means of which the harrow can be raised upward above the ground in moving the harrow from one place to another. After the harrow has been raised up, either this lever may be fastened down upon the tongue in any suitable manner, or a pin may be passed through the rod E above the top of the tongue, so as to hold the harrow in this elevated position.

By the use of the keeper, as here shown, I am enabled to apply the whole of the draft directly to the harrow, and thus avoid all liability to strain or bend the pivotal rod E, which is liable constantly to occur where the draft is applied to the frame alone.

Another advantage gained is that the draft being directly upon the harrow, it is drawn along smoothly and evenly, instead of having the power applied to the frame, which would cause an undue pressure upon the front edge of the harrow alone, and thus the work is made much easier upon the team.

Having thus described my invention, I claim—

In a rotary harrow, the combination of axle A, having a recess in its under side to catch over the top of guide I, so as to prevent the guide from revolving with the harrow, the rod E, guide I, and an elevating-lever for raising and lowering the harrow, the guide I having a clevis secured directly to its front end, and each one of its ends recessed on its under side, so as to catch under the edges of the harrow and keep it from tilting up, substantially as shown.

In testimony that I claim the foregoing I have hereunto set my hand this 10th day of May, 1880.

FLAVIUS J. LAMPTON.

Witnesses:
 W. J. DODSON,
 G. C. CRUSE.